(12) United States Patent
Xue et al.

(10) Patent No.: US 11,307,824 B2
(45) Date of Patent: Apr. 19, 2022

(54) ELECTRONIC BOARD, SYSTEM AND CONTROL METHOD FOR CONTROLLING ELECTRONIC BOARD

(71) Applicants: K-TRONICS (SUZHOU) TECHNOLOGY CO., LTD, Jiangsu (CN); BOE TECHNOLOGY GROUP CO., LTD., Beijing (CN)

(72) Inventors: Haowu Xue, Beijing (CN); Hunghuei Hsu, Beijing (CN); Liushuai Zhao, Beijing (CN)

(73) Assignees: K-TRONICS (SUZHOU) TECHNOLOGY CO., LTD., Jiangsu (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/264,418

(22) PCT Filed: Jun. 5, 2020

(86) PCT No.: PCT/CN2020/094564
§ 371 (c)(1),
(2) Date: Jan. 29, 2021

(87) PCT Pub. No.: WO2020/244618
PCT Pub. Date: Dec. 10, 2020

(65) Prior Publication Data
US 2021/0311686 A1    Oct. 7, 2021

(30) Foreign Application Priority Data

Jun. 5, 2019  (CN) .......................... 201910487326.4

(51) Int. Cl.
*G06F 3/14*    (2006.01)
*G06F 3/147*   (2006.01)
*H04W 4/80*    (2018.01)

(52) U.S. Cl.
CPC ............ *G06F 3/1454* (2013.01); *G06F 3/147* (2013.01); *G06F 3/1423* (2013.01); *H04W 4/80* (2018.02)

(58) Field of Classification Search
CPC ...... G06F 3/1454; G06F 3/1423; G06F 3/147; H04W 4/80; H04L 65/4015; H04L 29/06401
See application file for complete search history.

(56) References Cited

U.S. PATENT DOCUMENTS

| | | | |
|---|---|---|---|
| 8,416,148 B1* | 4/2013 | Park .................... | G06F 1/3262 345/1.1 |
| 2008/0198138 A1 | 8/2008 | McFarlane et al. | |

(Continued)

FOREIGN PATENT DOCUMENTS

| | | |
|---|---|---|
| CN | 202340279 U | 7/2012 |
| CN | 205092023 U | 3/2016 |

(Continued)

OTHER PUBLICATIONS

First Office Action dated Dec. 31, 2020, relating to CN Patent Application No. 201910487326.4.

(Continued)

*Primary Examiner* — Koosha Sharifi-Tafreshi
(74) *Attorney, Agent, or Firm* — Dinsmore & Shohl LLP (57) ABSTRACT

An electronic board, a system and a control method for controlling the electronic board are disclosed. A system for controlling an electronic board includes: a display screen, a data receiving circuit, a control circuit and a communication circuit, wherein the data receiving circuit is configured to receive first board data, where the first board data is unique data of the electronic board, the control circuit is configured to generate to-be-displayed board content according to the first board data and the second board data, the second board data is background template data, and the board content is (Continued)

content in a picture format; the communication circuit is configured to send the board content generated by the control circuit to one or more electronic boards.

11 Claims, 7 Drawing Sheets

(56) References Cited

U.S. PATENT DOCUMENTS

2014/0086105 A1* 3/2014 Kang .................. H04L 67/38
                                                            370/259
2017/0293826 A1* 10/2017 Kemmochi ............... B43L 1/04

FOREIGN PATENT DOCUMENTS

| | | |
|---|---|---|
| CN | 205722616 U | 11/2016 |
| CN | 107248383 A | 10/2017 |
| CN | 206833864 U | 1/2018 |
| CN | 108040133 A | 5/2018 |
| CN | 207718778 U | 8/2018 |
| CN | 109088926 A | 12/2018 |
| CN | 109104711 A | 12/2018 |
| CN | 109637350 A | 4/2019 |
| CN | 110221801 A | 9/2019 |
| CN | 110569010 A | 12/2019 |
| WO | 2016006967 A1 | 1/2016 |

OTHER PUBLICATIONS

Second Office Action dated Jun. 23, 2021, relating to CN Patent Application No. 201910487326.4.

* cited by examiner

ELECTRONIC BOARD, SYSTEM AND CONTROL METHOD FOR CONTROLLING ELECTRONIC BOARD

CROSS REFERENCES TO RELATED APPLICATIONS

This application is a national stage of International Application No. PCT/CN2020/094564, filed on Jun. 5, 2020, which claims priority to Chinese Patent Application No. 201910487326.4, filed on Jun. 5, 2019. Both of the aforementioned applications are hereby incorporated by reference in their entireties.

TECHNICAL FIELD

The present disclosure relates to the field of display technology, and more specifically to an electronic board, system and control method for controlling the electronic board.

BACKGROUND

Electronic boards have the functions of identification and display, and have practical applications in the fields of transportation, office, politics and education. For example, in the office field, there are table plates, working station plates, room number plates, etc. Take table plates as an example to introduce the similar situation of existing electronic tags in the office field. Table plates, also called table signs or table tags. Traditional table plates are usually paper and used to show the identity of participants. It is generally made by printing, color printing, etc., with rough appearance and is disposed after the meeting.

SUMMARY OF THE INVENTION

In some embodiments of the present disclosure, a system for controlling an electronic board is provided, including: a display screen, a data receiving circuit, a control circuit and a communication circuit, wherein the data receiving circuit is configured to receive first board data, where the first board data is unique data of the electronic board, the control circuit is configured to generate to-be-displayed board content according to the first board data and the second board data, the second board data is background template data, and the board content is content in a picture format; the communication circuit is configured to send the board content generated by the control circuit to one or more electronic boards.

In some embodiments, the control circuit is configured to generate the content in the picture format with a preset resolution according to the first board data and the second board data.

In some embodiments, the communication circuit comprises a wireless transmission module, the wireless transmission module includes a USB interface circuit, a transmission controller, a wireless transmission circuit and a USB power management circuit, wherein the USB interface circuit and the USB power management circuit are connected with the control circuit through the USB interface.

In some embodiments, the communication circuit comprises at least one of a near field communication interface, a Bluetooth communication interface, and a WiFi communication interface.

In some embodiments, the control system comprises a mobile phone or an upper machine.

In some embodiments, the first board data comprises: personnel-related data corresponding to a table plate scenario, working station-related data corresponding to a working station plate scenario, or conference related data corresponding to a room number plate scenario.

In some other embodiments of the present disclosure, there is provided an electronic board, including a communication circuit, a control circuit and a first display screen, the communication circuit is configured to receive a data stream sent from a peer device, where the data stream is board content to be displayed on the electronic board, the control circuit is configured to control the electronic board to display the board content provided by the communication circuit on the first display screen.

In some embodiments, the electronic board further comprises: a second display screen which is arranged opposite to the first display screen, wherein the control circuit is further configured to control the electronic board to display the board content provided by the communication circuit on the second display screen.

In some embodiments, the communication circuit comprises at least one of a near field communication interface, a Bluetooth communication interface, and a WiFi communication interface.

In some embodiments, in response to the communication circuit receiving a handshake protocol message, the control circuit wakes up the communication circuit to receive the board content to be displayed.

In some further embodiments of the present disclosure, there is provided a method for controlling an electronic board, the method is executed by a mobile phone or an upper machine, and the method includes: receiving a first board data input by a user on a user operation interface, wherein the first board data is unique data of the electronic board; generating a board content to be displayed according to the first board data and second board data, the second board data is background template data, and the board content is a content in a picture format; and sending the board content to one or more electronic boards.

In some embodiments, generating the board content to be displayed comprises: generating the content in the picture format with a preset resolution according to the first board data and the second board data.

In some embodiments, the first board data includes: personnel-related data corresponding to a table plate scenario, working station-related data corresponding to a working station plate scenario, or conference related data corresponding to a room number plate scenario.

In some still further embodiments of the present disclosure, there is provided a control method implemented by an electronic board, including: receiving a board content to be displayed; displaying the received board content on a display screen of the electronic board.

In some embodiments, the control method further comprises: in response to receiving a handshake protocol message, waking up a communication circuit of the electronic board to receive the board content to be displayed.

BRIEF DESCRIPTION OF THE DRAWINGS

In order to explain the technical solutions of the embodiments of the present disclosure more clearly, the drawings of the embodiments will be briefly introduced below. Obviously, the drawings in the following description only relate to some embodiments of the present disclosure, rather than limit the present disclosure.

DETAILED DESCRIPTIONS OF THE EMBODIMENTS

In order to make the purpose, technology and advantages of the embodiments of the present disclosure clearer, the technology of the embodiments of the present disclosure will be described below in conjunction with the accompanying drawings of the embodiments of the present disclosure. Based on the described embodiments of the present disclosure, all other embodiments obtained by those of ordinary skill in the art without creative labor are within the protection scope of the present disclosure.

Unless otherwise defined, the technical terms or scientific terms used in the present disclosure shall have the usual meanings understood by those with ordinary skills in the field to which this disclosure belongs. The "first", "second" and similar words used in the present disclosure do not indicate any order, quantity, or importance, but are only used to distinguish different components. Similarly, similar words such as "a", "an" or "the" do not mean a quantity limit, but mean that there is at least one. "include" or "comprise" and other similar words mean that the elements or objects appearing in front of the word cover the elements or objects listed after the word and their equivalents, without excluding other elements or objects. Similar words such as "connect" or "connected" are not limited to physical or mechanical connections, but may include electrical connections, whether direct or indirect. "Up", "Down", "Left", "Right", etc. are only used to indicate the relative position relationship. When the absolute position of the described object changes, the relative position relationship may also change accordingly.

The first aspect of the embodiments of the present disclosure proposes an electronic board, which can replace paper boards and can display content according to control instructions.

Figure 1:
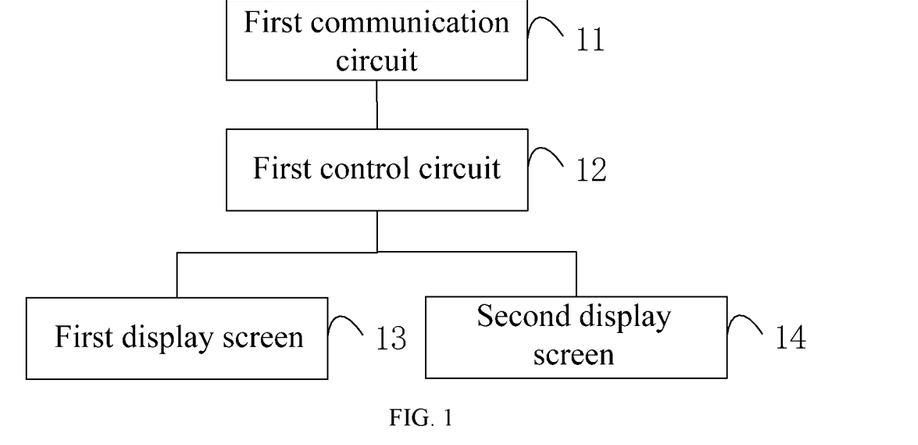
FIG. 1 is a schematic structural diagram of an electronic board according to some embodiments of the present disclosure.

As shown in FIG. 1, the electronic board includes a first communication circuit 11, a first control circuit 12, a first display screen 13 and a second display screen 14. The first display screen 13 and the second display screen 14 is arranged back-to-back (that is, the display screens face opposite directions or approximately the opposite directions), so that the display screens of the electronic board face two directions; for example, the first display screen and the second display screen are display screens independent of each other, or the first display screen and the second display screen form a double-sided display screen.

Taking the first display screen and the second display screen being independent display screens as an example, the screen sizes of the first display screen 13 and the second display screen 14 can be set according to requirements, and there is no limitation here. It should be understood that the second display screen 14 is not necessary, and in some embodiments, the electronic board may only include the first display screen 13.

The first communication circuit 11 is configured to receive a to-be-displayed board content sent by an opposite terminal apparatus (a mobile phone or an upper machine). For example, in the case that the board is a table plate, the board content includes relevant information of the participants of a meeting, such as one or more of names, work units, and titles. In the case where the board is a working station plate, the board content includes the information of the personnel at the working station, working station reservation information, advertisement information, and the like. In the case where the board is a room number plate of the conference room, the board content includes the scheduling information and advertisement information of the conference room.

For example, the board content is sent to the electronic board by a peer device (electronic device). For example, the board content is directly used for display after being sent to the electronic board by the electronic device. For example, the board content is a picture generated by the electronic device according to the user's editing of templates (such as electronic table plate templates, working station plate templates, room number plate templates), or a picture uploaded by a user on the electronic device, the picture is created by the user through other tools and uploaded to the electronic device.

Figure 2:
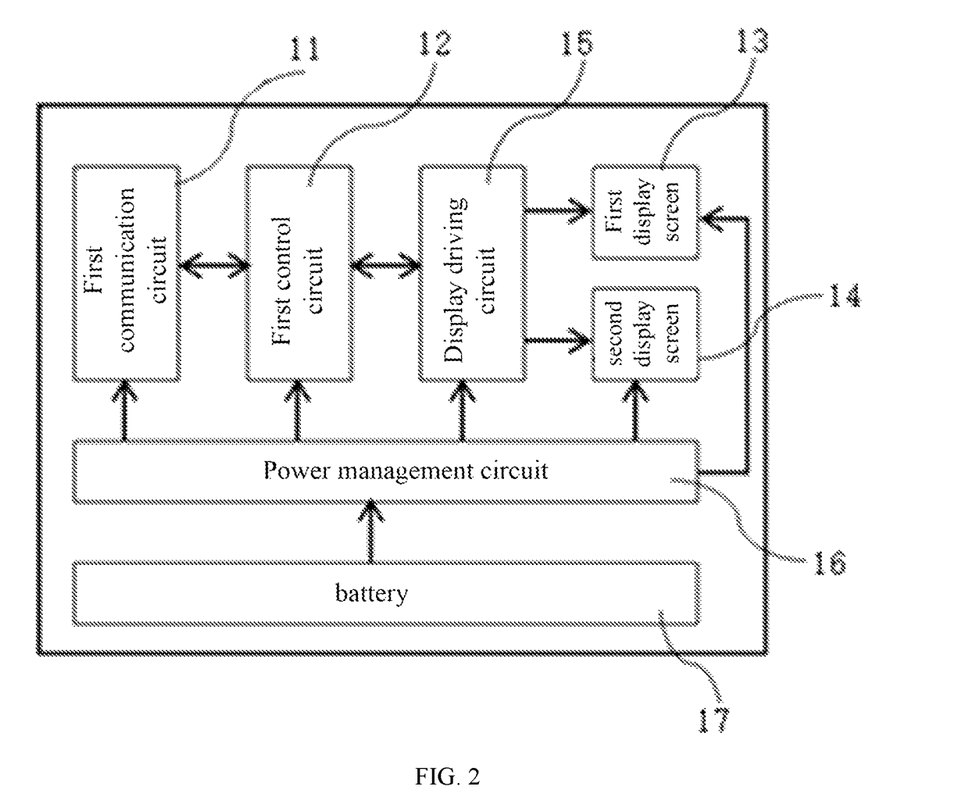
FIG. 2 is a schematic diagram of the structure of an electronic board according to some embodiments of the present disclosure.

The first control circuit 12 is configured to make the first display screen 13 and/or the second display screen 14 display the board content. For example, as shown in FIG. 2, the electronic board may further include a display driving circuit 15 for driving the first display screen 13 and the second display screen 14 to display the board content according to the control signal of the first control circuit 12 and the board content provided by the first control circuit 12. In response to the first communication circuit 11 receiving the board content, the first control circuit 12 causes the display screen to display the board content. And in response to the first communication circuit 11 receiving the updated board content, the first control circuit 12 causes the display screen to display the updated board content.

For example, the first display screen 13 and/or the second display screen 14 are liquid crystal display screens, OLED display screens, quantum dot display screens, etc., and may also be electronic ink screens.

It can be seen from the above embodiments that the electronic board provided by the embodiments of the present disclosure receives the board content from the peer device (mobile terminal such as mobile phone, or an upper machine such as conference management device, conference machine, etc.) through the first communication circuit and display the board content by the first display screen and/or the second display screen. On the one hand, it facilitates the display of board information, no need to make paper boards, it is more convenient to use, and also saves resources. On the other hand, through the board content is displayed on both sides, in addition to other participants, the participant corresponding to the board content can also see the display content, which is helpful for the participants to find seats and correct errors.

For example, the first communication circuit 11 may include at least one of a wired communication circuit (such as USB) and a wireless communication circuit (such as WiFi, Bluetooth, and Near Field Communication (NFC)). In some embodiments, the communication between the first communication circuit 11 and the electronic device may be achieved through wireless communication. For example, the first communication circuit 11 is configured to receive the board content from an electronic device through a wireless communication circuit; wherein the board content is a data stream encapsulated by a private protocol. For example, the private protocol may include a Bluetooth private protocol or a 2.4 GHz private protocol. In this way, the board content is received through the wireless communication mode without a wired connection with the electronic device, which makes the use of the electronic board more convenient. At the same time, the low-power private protocol ensures the safety of transmission. In addition, the private protocol cooperates with the circuit design. Except for the standby current of microampere level, no power is needed when not refreshing, which further reduces power consumption and realizes a longer standby. Of course, when the board content is a data stream encapsulated by a private protocol, the first control circuit 12 also needs to convert the data stream to the data format that can be used for the display of the first display screen 13 and the second display screen 14.

For example, the private protocol is designed based on the Bluetooth transmission protocol, which defines the data protocol when receiving data and sending data. Specifically, the data format of the private protocol is shown in Table 1.

TABLE 1

Private protocol data format

| Field | Name of Field | Length |
|---|---|---|
| AA + AA | Data header | 2 Bytes |
| 00 | Designated AP, the corresponding designated AP processing the sent data | 1 Byte |
| lengthH + lengthL | Length of data | 2 Bytes |
| 55 | Byte indicating the data command | 1 Byte |
| AP | AP indicating AP from which the data is sent | 1 Byte |
| MAC | To which the data is sent | 6 Bytes |
| datacount | Total number of packages | 1 Byte |
| datanum | Number of the current data package | 1 Byte |
| data | data | 256 Bytes |
| checksum | check codes | 3 Bytes |
| 0D + 0A | End of data | 2 Bytes |

For example, the data format of sending display screen data (usually 256 bytes) is
AA+AA+00+lengthH+lengthL+55+AP+MAC(6)+datacount(1)+datanum(1)+data(256)+checksum(3)+0D+0A.

Specifically, the format of the command for the provide protocol is shown in Table 2.

TABLE 2

Format of the command for the provide protocol

| field | Name of field | length |
|---|---|---|
| AA + AA | Data header | 2 Bytes |
| 00 | Designated AP | 1 Byte |
| MAC | To which device the data is send | 6 Bytes |
| lengthH + lengthL | Length of data | 2 Bytes |
| A0 | Byte indicating the data command | 1 Byte |
| command | Command | 1 Byte |
| command_next | Status of the next command | 1 Byte |
| checksum | Check codes | 3 Bytes |
| 0D + 0A | End of data | 2 Bytes |

For example, the format of sending a command (usually 20 bytes) is:
AA+AA+00+lengthH+lengthl+A0+command(1)+checksum(3)+0D+0A.

It should be noted that the data format and command format of the above-mentioned private protocol are merely illustrative, and it is conceivable that similar private protocols can also be applied to the present disclosure, and the protection scope should not be limited to this example.

For example, the first communication circuit 11 may also be configured to receive the board content from an electronic device through near field communication technology (NFC) and/or Bluetooth communication technology. When the electronic device is a mobile terminal (mobile phone, etc.), it more convenient to use NFC or Bluetooth.

For example, as shown in FIG. 2, the electronic board may further include a power management circuit 16 and a battery 17 for realizing power supply and management of various components of the entire electronic board.

The following briefly introduces the working process of the electronic board.

When the first communication circuit 11 receives the handshake protocol message, the first control circuit 12 wakes up the first communication circuit 11 to receive the board content. The first control circuit 12 controls the display driving circuit 15 to drive the first display screen 13 and the second display screen 14. The first display screen 13 and the second display screen 14 update the screen after receiving the complete data. The power of the whole process is provided by the battery (rechargeable battery or replaceable battery) 17, and is managed by the power management circuit 16.

The second aspect of the embodiments of the present disclosure provides an electronic device described above.

Figure 3:
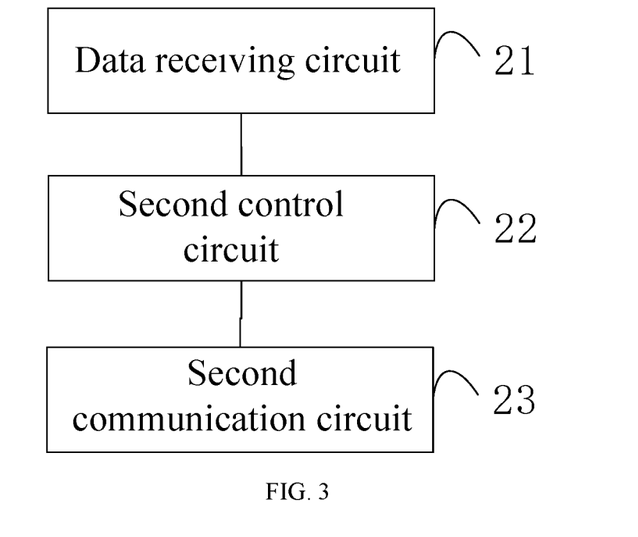
FIG. 3 is a schematic structural diagram of an electronic board according to some embodiments of the present disclosure.

As shown in FIG. 3, the electronic device includes a data receiving circuit 21, a second control circuit 22, and a second communication circuit 23.

The data receiving circuit 21 is configured to receive the first board data to be displayed on the electronic board. The first board data is unique data of the electronic board. For example, the first board data includes: personnel related data corresponding to the scenario of the table plate (Such as the name of the participant, work unit, title, etc.), the working station-related data corresponding to the scenario of the working station plate (such as the number of the working station, the name of the person at the working station, photos, etc.), or meeting-related data (such as meeting arrangement information, etc.) corresponding to the scenario of the conference room door plate. The data receiving circuit 21 is also configured to receive a user's selection of a background template.

The information displayed on the template may be input to the data receiving circuit by the user through the user operation interface of the electronic device, or may be created by the user through other tools and uploaded to the electronic device.

For example, the data receiving circuit 21 may be a data receiving circuit electrically connected to an external input device, and is configured to convert the input signal from the external input device into corresponding data information. When the electronic device is a computer (PC, laptop, etc.), the external input device can be a mouse, keyboard, etc., and when the electronic device is a mobile device (mobile phone, PAD, etc.), the external input device can be a touch control mechanism, keys or external keyboard, etc.

The second control circuit 22 is configured to generate a board content based on the first board data and the second board data. The second board data is background template data, and the board content is in image format. The background template data may be locally pre-stored background template data.

For example, the second control circuit 22 is further configured to generate content in a picture format with a preset resolution according to the first board data and the second board data. For example, the resolution is a preset picture resolution value that is small in file size but can meet the display requirements of the electronic board. In this way, the board content is processed into a picture format file with the preset resolution, which minimizes the burden of data transmission between the electronic device and the electronic board, thereby improving the efficiency of data transmission.

In some embodiments, the electronic boards include multiple groups, and each group includes one or more electronic boards. The second communication circuit 23 is configured to send the board content to one or more electronic boards.

As an embodiment, when the board content is sent to one or more electronic boards, the electronic board directly displays the board content.

Here, the one or more electronic boards as the sending destination may be preset electronic boards, or electronic boards selected by the user by operating the electronic device. For example, there are multiple electronic boards arranged in the meeting place. For each electronic board, the board content to be displayed is usually different from other electronic boards. If the board content that needs to be displayed on a certain electronic board is generated, the instruction will be issued to send the board content to the corresponding electronic board.

It can be seen from the above embodiments that the electronic device provided by the embodiments of the present disclosure receives the board data and generates board content, and sends it to the designated electronic board for display, so that the electronic board itself only needs to display the board content, thereby reducing the burden of electronic boards.

For example, the second communication circuit 23 may include at least one of a wired communication circuit (such as USB) and a wireless communication circuit (such as WIFI, Bluetooth, and Near Field Communication (NFC)). In some embodiments, the communication between the second communication circuit 23 and the electronic board can be achieved through wireless communication. For example, the second communication circuit 23 is configured to send the board content to a designated electronic board through wireless communication technology; wherein, the board content is a data stream encapsulated by a private protocol. For example, the private protocol may include a Bluetooth private protocol or a 2.4 GHz private protocol. In this way, the board content is sent through wireless communication, and the electronic board does not need to be connected to the electronic device by wire, which makes the use of the electronic board more convenient. At the same time, the low-power private protocol ensures the safety of transmission. In addition, the private protocol cooperates with the circuit design. Except for the standby current of microampere level, no power is needed when not refreshing, which further reduces power consumption and realizes a longer standby.

For example, the second communication circuit 23 is configured to send the board content to a designated electronic board through near field communication technology and/or Bluetooth communication technology. When the electronic device is a mobile terminal, it can communicate with the electronic board through NFC or Bluetooth communication, which is more convenient to use.

Figure 4:
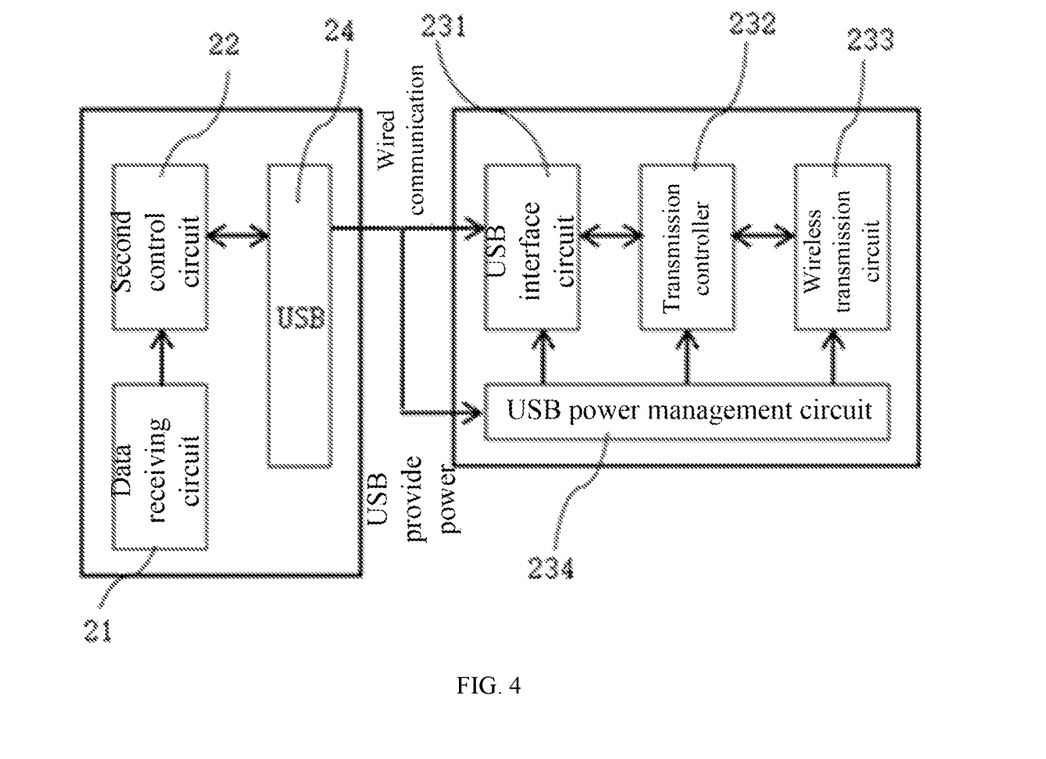
FIG. 4 is a schematic diagram of the structure of an electronic board according to some embodiments of the present disclosure.

As an embodiment, when the electronic device is a computer (PC, laptop, etc.), it can communicate with the electronic board and/or other electronic devices (including mobile terminals) in a wired or wireless communication manner. For example, when the electronic device is a computer (PC, laptop, etc.) and communicates in a wireless manner, the second communication circuit 23 may be a wireless transmitting module, as shown in FIG. 4, the wireless transmitting module may specifically include: USB interface circuit 231, transmission controller 232, wireless transmission circuit 233, USB power management circuit 234. The USB interface circuit 231 and USB power management circuit 234 are both connected to the USB interface 24 of the electronic device through a USB connection line. The transmission controller 232 is configured to convert the board content sent by the electronic device into wireless communication data, and transmitting the wireless signal through the wireless transmission circuit 233.

In some embodiments, the combination of a computer and a wireless transmitting module can be regarded as an electronic device. In this case, with respect to the data receiving circuit 21 and the second control circuit 22, the second communication circuit 23 may be a component physically separate from them. In other words, the second communication circuit 23 may be a component attached to a computer including the data receiving circuit 21 and the second control circuit 22 through a USB interface.

The electronic device is mainly used to edit the information of the participants of the meeting, make complex background templates, etc. Its main functions may include: verifying the produced board content in the picture format to detect whether it meets the requirements; or, the board content is further processed into the required picture quality and resolution to reduce the amount of data and improve transmission efficiency; check the signal status of the electronic board, battery power, or check the status of wireless transmission; specify the electronic board that needs to be refreshed; built-in several background templates for people to choose, and people can edit text (select font, adjust position, etc.) and pictures (photos, icons, etc.) based on the template; people can send the board content to the designated electronic board via wired or wireless means.

For example, one of the methods of using the electronic device is as follows:

Place the electronic board at the designated position of the conference table;

After the relevant electronic board operating software is installed on the electronic device, the wireless transmitting module is connected to the wired interface (such as USB) of the computer;

The user inputs the to-be-displayed board data through the user operation interface of the electronic device (such as the upper machine), such as the related information of the participants in the scenario of the table plate, the conference room related information in the scenario of the room number plate, and the working station plate usage information in the scenario of the working station plate, and the background template selection information. Then, the board content is generated based on board data. The board content can be generated by the electronic device according to a pre-generated template and the information filled in the template by the user, and the board content can be information to be displayed in a picture format or non-picture format information generated by the electronic device;

After the electronic device verifies the board content, it sends the board content to the electronic board.

In some embodiments, when the electronic device is a mobile terminal, the electronic device also has functions such as image processing and template making, and can also have two types of wireless communication: private protocol transmission based on Bluetooth hardware transmission and NFC transmission to ensure the convenience and safety of data communication. The main functions of the mobile terminal can include: receiving the board content sent by the electronic device in the form of a computer and detecting whether it meets the requirements; or, further processing the board content to the required picture quality and resolution to reduce the amount of data and improve transmission efficiency. The mobile terminal also can check the status of electronic boards and wireless transmission status; can specify the electronic boards that need to be refreshed, and set the transmission mode; can select templates with built-in several background templates, and can edit texts (select font, adjust position, etc.) and pictures (photos, icons, etc.) on the basis of templates.

The method of using the electronic device in the form of a mobile terminal is briefly introduced as follows:

The dual-screen electronic ink screen is placed at the designated position of the conference table.

The mobile terminal is installed with the relevant electronic board application, and the user inputs the board data to be displayed in the mobile terminal, such as the relevant information of the participants in the table plate scenario, the meeting room information in the room number plate scenario, the usage information of the working station plate in the working station plate scenario, and the background template selection information; then, the board content is generated according to the board data.

After the user verifies the board content through the mobile terminal, the board content is sent to the designated electronic board through a low-power private protocol, or the board content is transferred to the designated electronic board through NFC or Bluetooth.

In some embodiments of the present disclosure, a system for controlling an electronic board is proposed, which includes a display screen, and the data receiving circuit 21, the second control circuit 22, and the second communication circuit 23 as described above. It should be understood that this system may include electronic device as described above. Alternatively, the system may include: a terminal device including the display screen and the data receiving circuit 21, and a cloud server including the second control circuit 22 and the second communication circuit 23. The terminal device communicates with the cloud server through a known wireless communication technology. In other words, the data receiving circuit 21, the second control circuit 22, and the second communication circuit 23 as described above can be distributed in different physical devices according to actual needs.

In the third aspect of the embodiments of the present disclosure, an electronic board system is proposed.

The electronic board system includes: any embodiment of at least one electronic board or an arrangement or combination of the embodiments, and any embodiment of at least one electronic device or an arrangement or combination of the embodiments.

Figure 5A:
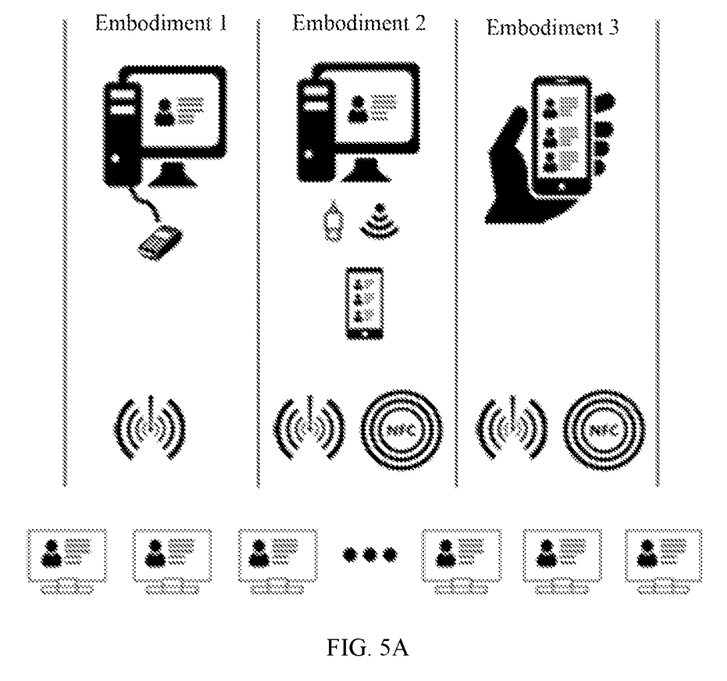
FIG. 5A is a schematic diagram of the electronic board system according to some embodiments of the present disclosure.

As shown in FIG. 5A, the electronic board system may include different implementations.

Figure 5B:
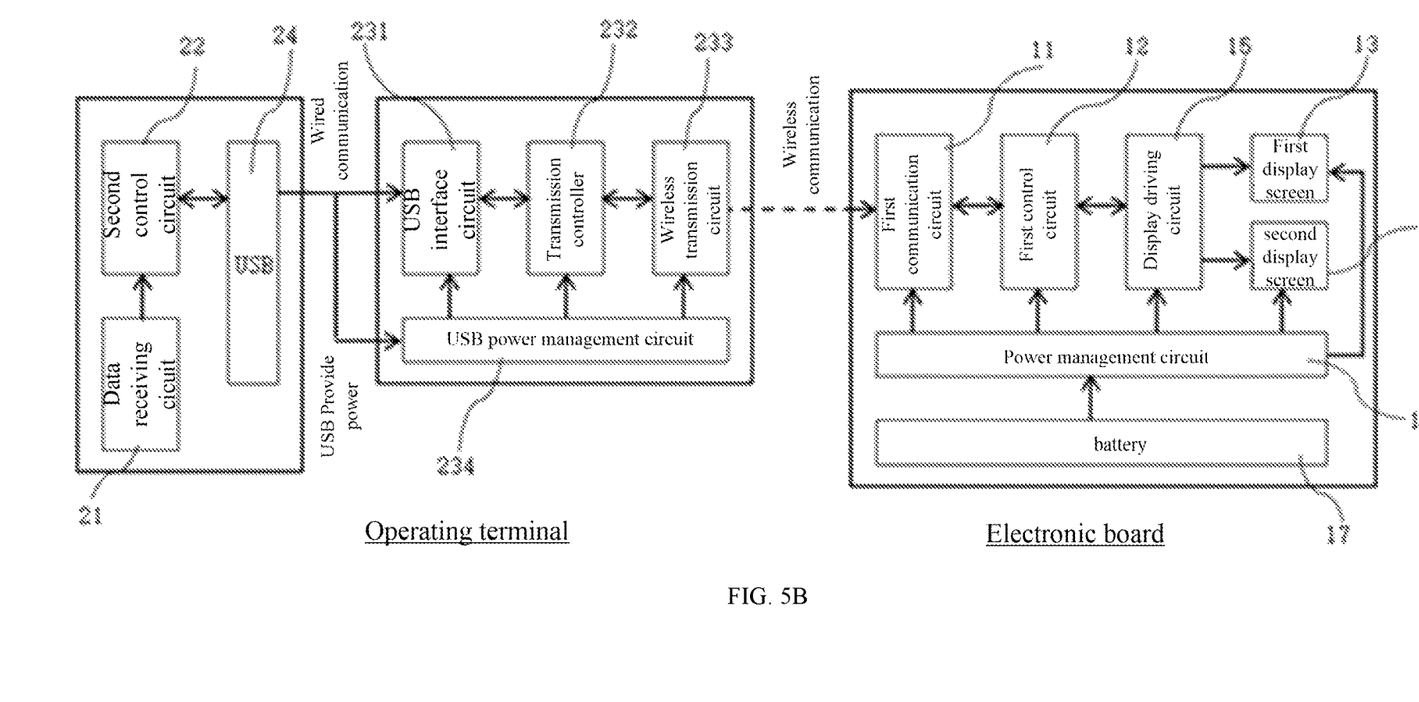
FIG. 5B is a schematic structural diagram of an electronic board system according to some embodiments of the present disclosure.

As an embodiment, as shown in FIG. 5B, the electronic board system includes an operating terminal (PC, laptop, etc.) and an electronic board.

The user first determines the information and the number of participants, designs the background and names and other information through the operation terminal, and then the board content is output in a picture format. The picture format can be a format that the operation terminal can support. In this way, with the operating terminal generating the board content, the size of the board content in the picture format can be reduced through algorithms, and the operation terminal may determine whether the board content in the picture format is qualified. In addition, the user can also select the built-in template through the operating terminal for picture production and verification. After the board content in the picture format is prepared, it is connected to the wireless sending module through the USB port 24 of the operating terminal to transmit the data stream encapsulated according to the private protocol.

The USB power management circuit 234 obtains power from the USB interface of the operating terminal, and the interface circuit 231 that drives the wireless transmission receives the data stream and is controlled by the transmission controller 232. The wireless transmission circuit 233 sends handshake protocol messages and the data stream according to the rules specified by the private protocol.

After the first communication circuit 11 of the electronic board receives the handshake protocol message, the first control circuit 12 wakes up the first communication circuit 11 to receive the data stream, and the first communication circuit 11 controls the display driving circuit 15 to drive the first display screen 13 and the second display screen 14. The first display screen 13 and the second display screen 14 update the screen after receiving the complete data stream to complete the display of the board content. The power of the whole process is provided by the battery (rechargeable battery or replaceable battery) 17 and managed by the power management circuit 16.

Figure 5C:
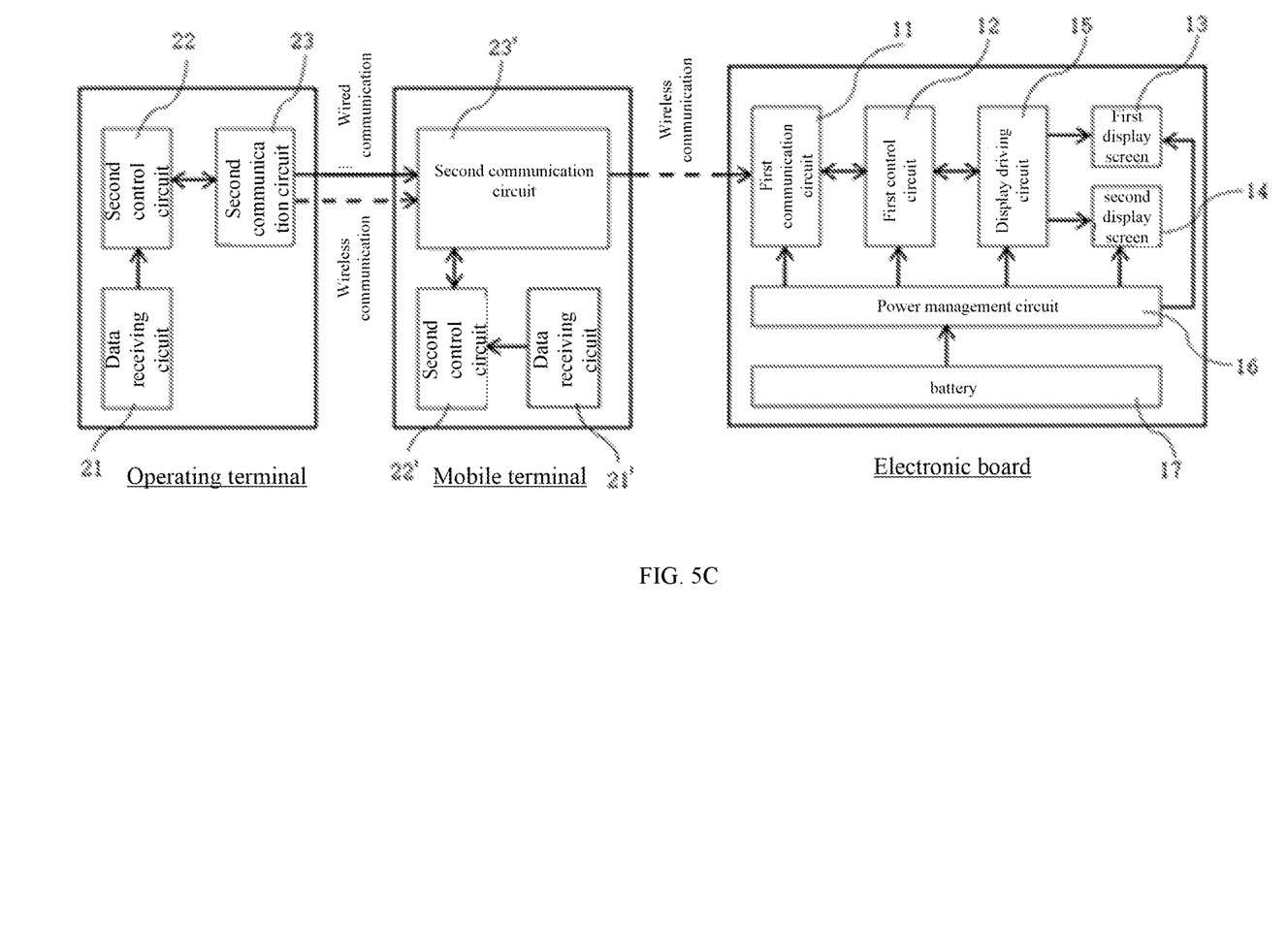
FIG. 5C is a schematic structural diagram of an electronic board system according to some embodiments of the present disclosure.

As another embodiment, as shown in FIG. 5C, the electronic board system includes an operating terminal (PC, laptop, etc.), a mobile terminal (mobile phone, etc.), and an electronic board.

The user first determines the information and the number of participants of the meeting, designs the background and names and other information through the operation terminal, and then the board content is output in a picture format. The picture format is a format that the operation terminal can support. Then, the operating terminal sends the board content in the picture format to the mobile terminal through wireless communication or USB wired connection.

After the mobile terminal receives the board content in the picture format, the board content is further processed. The picture size is reduced through the algorithm, the picture is determined whether it is qualified through verification, and the mobile terminal approaches the electronic board to send, through Bluetooth or NFC, a handshake protocol message and data flow encapsulated by a private protocol.

After the first communication circuit 11 of the electronic board receives the handshake protocol message, the first control circuit 12 wakes up the first communication circuit 11 to receive the data stream, and the first communication circuit 11 controls the display driving circuit 15 to drive the first display screen 13 and the second display screen 14. The first display screen 13 and the second display screen 14 update the screen after receiving the complete data stream to complete the display of the board content. The power of the whole process is provided by the battery (rechargeable battery or replaceable battery) 17 and managed by the power management circuit 16.

It should be noted that the difference between the names of the mobile terminal and the operating terminal here is just for distinction. In fact, both the mobile terminal and the operating terminal are specific examples of electronic devices.

In this embodiment, the addition of the mobile terminal only adds further processing and verification of the board content, which improves the data transmission efficiency and the accuracy of the displayed content of the electronic board.

Figure 5D:
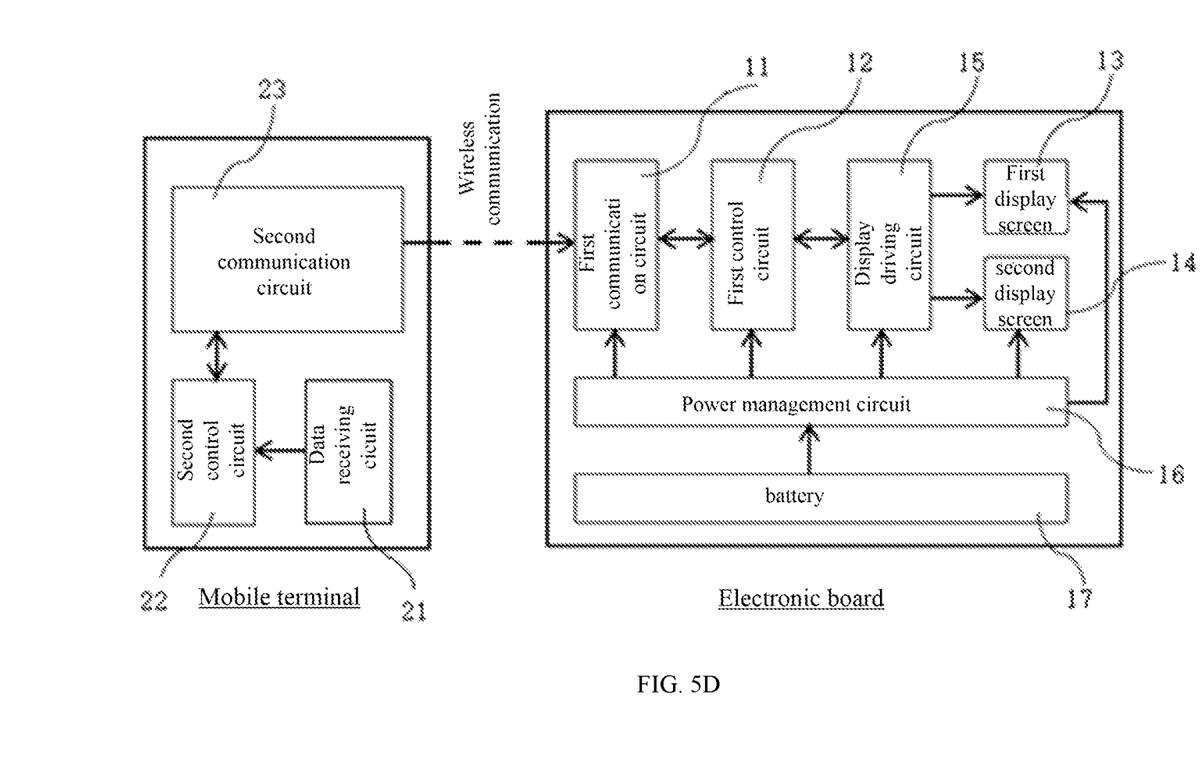
FIG. 5D is a schematic structural diagram of an electronic board system according to some embodiments of the present disclosure.

As another embodiment, as shown in FIG. 5D, the electronic board system includes a mobile terminal (mobile phone, etc.) and an electronic board.

The user first determines the information and the number of participants of the meeting, designs the background and names and other information through the mobile terminal, and then the board content is output in a picture format. The picture format can be a format that the mobile terminal can support. Then the board content in the image format is processed to reduce the file size of the board content in the image format, and is checked whether it meets the requirements. Then the mobile terminal approaches the electronic board to transmit, through Bluetooth or NFC, the handshake protocol message and data stream encapsulated by the private protocol.

After the first communication circuit 11 of the electronic board receives the handshake protocol message, the first control circuit 12 wakes up the first communication circuit 11 to receive the data stream, and the first communication circuit 11 controls the display driving circuit 15 to drive the first display screen 13 and the second display screen 14. The first display screen 13 and the second display screen 14 update the screen after receiving the complete data stream to complete the display of the board content. The power of the whole process is provided by the battery (rechargeable battery or replaceable battery) 17 and managed by the power management circuit 16.

It should be noted that, as can be seen from this embodiment, the electronic device can be implemented by a mobile terminal, which is more convenient to use.

It can be seen from the above embodiments that the electronic board system provided by the embodiments of the present disclosure is reliable, safe, easy to operate, and has the characteristics of low power consumption and mobility for the case of a meeting. The application scenarios are very wide and suitable for various sizes of meetings.

It should be noted that, when the aforementioned operating terminal and mobile terminal implement the functions of the above embodiments, they can be implemented in the form of a software or an application program, which will not be repeated here.

The fourth aspect of the embodiments of the present disclosure provides a control method executed by an electronic board, which can solve, to a certain extent, the problem of waste of resources of traditional boards.

Figure 7:
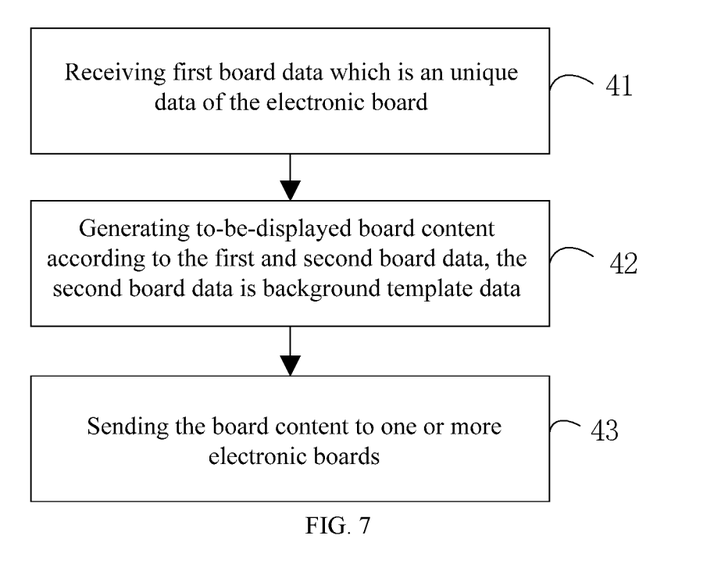
FIG. 7 is a schematic flowchart of a control method of an electronic apparatus according to some embodiments of the present disclosure.

The control method executed by the electronic board includes:

Step 31: receiving the board content to be displayed;

Step 32: displaying the received board content on the display screen of the electronic board. It should be noted that in the case where the electronic board only includes the first display screen, in step 32, only the first display screen displays the board content.

It can be seen from the above embodiments that in the control method of the electronic board provided by the embodiments of the present disclosure, by receiving the board contents and displaying the board contents through the first and second display screens arranged opposite to each other, it is convenient for the display of the board information, eliminating the need to make paper boards, which is more convenient to use and saves resources. On the other hand, the board contents are displayed on both sides, besides other participants of the meeting, the participants corresponding to the board contents himself can also see the displayed content, which helps participants to find seats and correct false information.

For example, receiving the board content to be displayed, including:

The board content from an electronic device (alternatively, a control system) is received through a wireless communication technology; wherein the board content is a data stream encapsulated by a private protocol.

In this way, the board content is received through the wireless communication mode without a wired connection with the electronic device, which makes the use of the electronic board more convenient. At the same time, the low-power private protocol ensures the safety of transmission. In addition, the private protocol cooperates with the circuit design. Except for the standby current of microampere level, no power is needed when not refreshing, which further reduces power consumption and realizes a longer standby.

In the fifth aspect of the embodiments of the present disclosure, a method for controlling electronic boards is provided, which can solve, to a certain extent, the problem of wasting resources of traditional boards.

Figure 6:
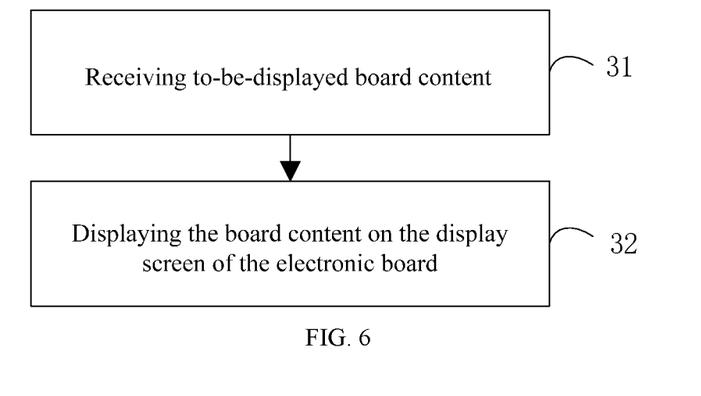
FIG. 6 is a schematic flowchart of a control method of an electronic board according to some embodiments of the present disclosure.

The method for controlling the electronic board is executed by a mobile phone or an upper machine and includes:

Step 41: receiving the first board data input by the user on the user operation interface, where the first board data is unique data of the electronic board;

Step 42: generating the to-be-displayed board content according to the first board data and the second board data, the second board data is background template data, and the board content is the content in a picture format;

Step 43: sending the board content to one or more electronic boards.

It can be seen from the above embodiments that the method for controlling electronic boards provided by the embodiments of the present disclosure receives board data and generates board content, and sends it to the electronic board for display, so that the electronic board itself only needs to display the board content, thereby reducing the burden of electronic boards.

For example, generating the to-be-displayed board content includes: generating content in a picture format with a preset resolution according to the first board data and the second board data.

For example, the resolution is a preset picture resolution value that is small in file size but can meet the display requirements of the electronic board. In this way, the board content is processed into a picture format file with a preset resolution, which minimizes the burden of data transmission between the electronic device and the electronic board, thereby improving the efficiency of data transmission.

For example, sending the board content to one or more electronic boards, including:

The board content is sent to a designated electronic board through wireless communication technology; wherein, the board content is a data stream encapsulated by a private protocol.

In this way, the board content is sent through wireless communication, and the electronic board does not need to be connected to the electronic device by wire, which makes the use of the electronic board more convenient. At the same time, the low-power private protocol ensures the safety of transmission. In addition, the private protocol cooperates with the circuit design. Except for the standby current of microampere level, no power is needed when not refreshing, which further reduces power consumption and realizes a longer standby.

In the present disclosure, the control circuit includes hardware components capable of implementing control functions such as a processor; the communication circuit includes hardware components capable of implementing communication functions such as an interface circuit; and the data receiving circuit includes hardware components capable of implementing data receiving functions such as a transceiver.

Those of ordinary skill in the art should understand that the above descriptions are only specific embodiments of the present disclosure and are not intended to limit the present disclosure. Any modification, equivalent replacement, improvement etc. made within the spirit and principle of the present disclosure should be included in the protection scope of the present disclosure.

What is claimed is:

1. A system for controlling an electronic board, including:
a receiving circuit configured to receive first board data, where the first board data is unique data of the electronic board,
a control circuit configured to generate a board content according to the first board data and second board data, the second board data is background template data, and the board content is a content in a picture format; and
a communication circuit configured to send the board content to one or more electronic boards,
wherein the communication circuit comprises a wireless transmission module,
the wireless transmission module includes a USB interface circuit, a transmission controller, a wireless transmission circuit and a USB power management circuit, wherein the USB interface circuit and the USB power management circuit are connected with the control circuit through the USB interface.

2. The system according to claim 1, wherein the control circuit is configured to generate the content in the picture format with a preset resolution according to the first board data and the second board data.

3. The system according to claim 1, wherein the communication circuit comprises at least one of a near field communication interface, a Bluetooth communication interface, and a WiFi communication interface.

4. The system according to claim 1, wherein the system comprises a mobile phone or an upper machine.

5. The system according to claim 1, wherein the first board data comprises:
personnel-related data corresponding to a table plate scenario, working station-related data corresponding to a working station plate scenario, or conference related data corresponding to a room number plate scenario.

6. An electronic board, including
a communication circuit configured to receive a data stream, where the data stream includes a board content,
a first display screen configured to display the board content; and
a control circuit configured to control the display screen to display the board content,
wherein in response to the communication circuit receiving a handshake protocol message, the control circuit wakes up the communication circuit to receive the board content to be displayed.

7. The electronic board according to claim 6, further comprising:
a second display screen which is arranged opposite to the first display screen, wherein the control circuit is further configured to control the second display screen to display the board content.

8. The electronic board according to claim 6, wherein the communication circuit comprises at least one of a near field communication interface, a Bluetooth communication interface, and a WiFi communication interface.

9. A method for controlling an electronic board, including:
receiving a first board data input by a user on a user operation interface, wherein the first board data is unique data of the electronic board;
generating a board content according to the first board data and second board data, the second board data is background template data, and the board content is a content in a picture format; and
sending the board content to one or more electronic boards, wherein the first board data includes: personnel-related data corresponding to a table plate scenario, working station-related data corresponding to a working station plate scenario, or conference related data corresponding to a room number plate scenario.

10. The method according to claim 9, wherein generating the board content to be displayed comprises: generating the content in the picture format with a preset resolution according to the first board data and the second board data.

11. The method according to claim 9, wherein the method is executed by a mobile phone or an upper machine.

* * * * *